United States Patent [19]
Waldman et al.

[11] Patent Number: 4,726,048
[45] Date of Patent: Feb. 16, 1988

[54] TELEPHONE PRIVACY CIRCUIT

[76] Inventors: Herbert H. Waldman, 1739 52nd St.; Kalman Drebin, 1683 54th St., both of Brooklyn, N.Y. 11204

[21] Appl. No.: 596,357

[22] Filed: Apr. 3, 1984

[51] Int. Cl.⁴ .............................................. H04M 1/68
[52] U.S. Cl. ........................................ 379/7; 379/387; 379/396
[58] Field of Search ................. 179/81 R, 81 E, 84 R, 179/81 C, 84 C; 379/7, 387, 396, 62, 184, 161, 168

[56] References Cited

U.S. PATENT DOCUMENTS

| | | | |
|---|---|---|---|
| 4,136,266 | 1/1979 | Cohen et al. | 179/81 E |
| 4,459,435 | 7/1984 | Foldvary et al. | 179/84 C |
| 4,529,843 | 7/1985 | Boeckmann | 179/81 R |

FOREIGN PATENT DOCUMENTS 2014826 8/1979 United Kingdom ............... 179/81 E

Primary Examiner—James L. Dwyer
Attorney, Agent, or Firm—Ostrolenk, Faber, Gerb & Soffen

[57] ABSTRACT

A telephone privacy circuit is disclosed. The privacy circuit preferably includes a voltage breakdown device which passes current only when the voltage across the device is greater than a predetermined value. The voltage breakdown device is connected in series with a telephone to be protected. The predetermined value is chosen to be lower than the line voltage across the tip and ring terminals of a telephone line when every telephone connected to that line is in the on-hook position. In one embodiment of the invention, the predetermined value is selected to be higher than the line voltage across the tip and ring terminals of the telephone line when a telephone connected to that line is placed on the off-hook condition. In another embodiment of the invention, a voltage breakdown device is connected to the gating element of an electronic latching device.

30 Claims, 5 Drawing Figures

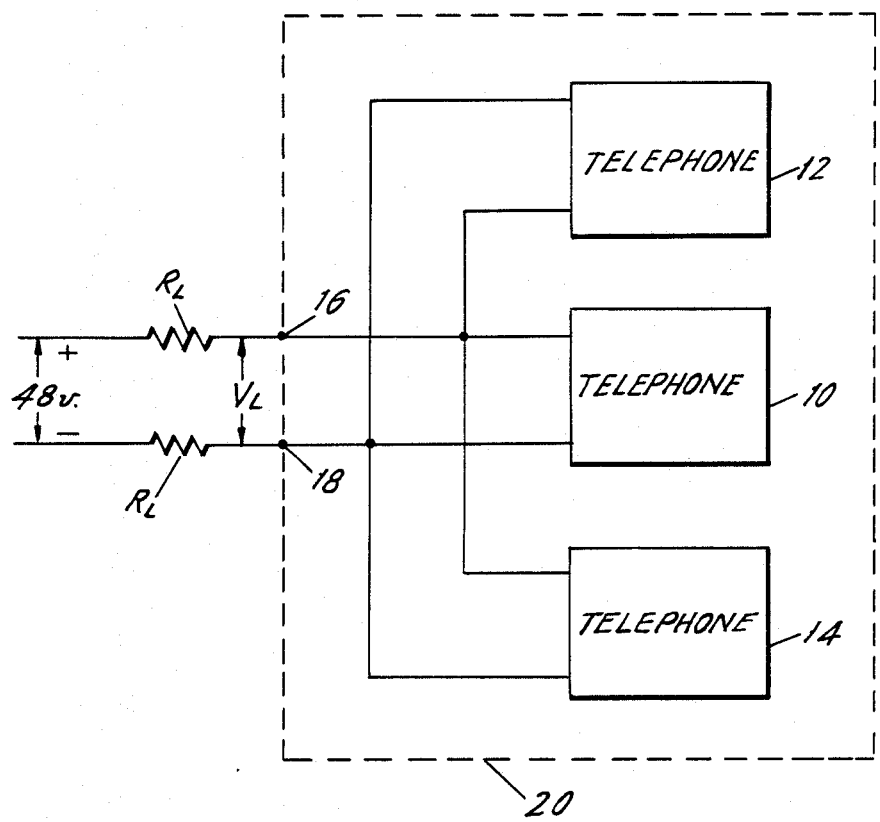

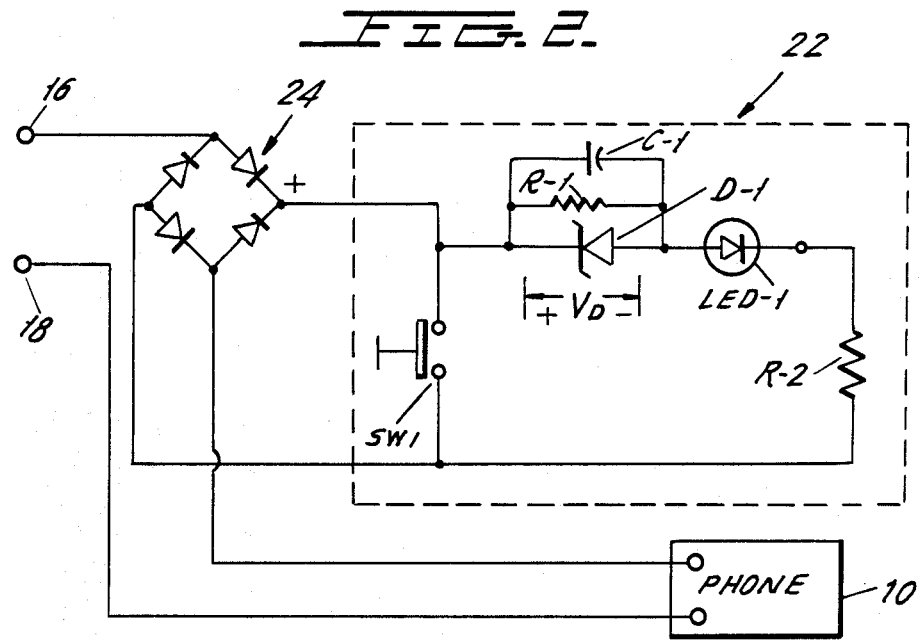
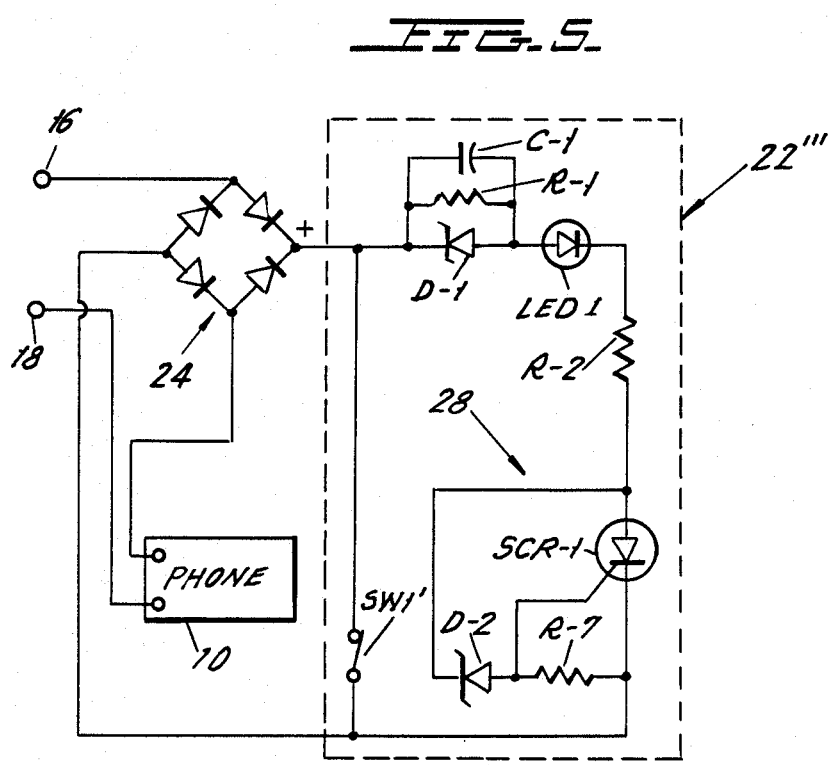

TELEPHONE PRIVACY CIRCUIT

BACKGROUND OF THE INVENTION

The present invention is directed towards a telephone apparatus, and more particularly, an apparatus for preventing and/or indicating to the user of a telephone that an attempt is being made by a third party to eavesdrop on his conversation.

With an increasing number of extension telephones and/or an increasing number of plug-in receptacles present in a residence or business, the problem of eavesdropping on telephone conversations is becoming more and more of a problem. The problem has been compounded by the increased use of private telephone equipment.

The prior art has recognized the problem of eavesdropping and has taken steps to reduce or eliminate the same by either alerting the user of attempts at eavesdropping or excluding a potential eavesdropper from audio access to telephone lines that are in use. For the most part, these prior art attempts have required complex circuitry and costly installations. U.S. Pat. No. 3,499,121 to MacIntosh et al. discloses a privacy circuit which ensures that only one telephone of a plurality of extension telephones connected to the same telephone line will gain access to the telephone line. In order to be effective, a respective privacy circuit must be provided for each extension telephone. The heart of the privacy circuit is an SCR which is connected in series with the extension telephone and a Zener diode which is connected to the gate of the SCR. The Zener diode is driven into reverse saturation when the extension telephone is first placed in the off-hook condition (defined herein as that condition wherein the hook switch of the telephone is in the upper or raised position) since the full line voltage (nominally 48 volts) will be available to the Zener diode. When driven into the reverse bias condition, the Zener diode will apply a firing signal to the gate of the SCR turning the SCR on. The SCR will stay on as long as driving current is available through the extension telephone.

If a second extension telephone is subsequently placed in the off-hook condition, the line voltage available to the Zener diode of the privacy circuit connected to the second extension telephone will be insufficient to drive the Zener diode into reverse saturation and the SCR of the privacy circuit will not be fired. As such, the second extension telephone will not gain access to the telephone line.

The primary drawback of the MacIntosh privacy circuit is that it requires the use of a separate privacy circuit for each extension telephone. If any extension telephone does not include a privacy circuit, a person picking up that extension telephone will be permitted to eavesdrop on the conversation of the party already using another extension telephone at that residence without the knowledge of the first user, although his extension telephone is equipped with the MacIntosh privacy circuit.

U.S. Pat. No. 4,136,266 to Cohen et al. discloses a privacy circuit which need only be connected in series with that extension telephone which is to be protected. This privacy circuit protects the fact that an extension telephone has been placed in the off-hook condition by detecting "click" signals which are placed on the telephone line whenever any extension telephone is placed either in the off-hook condition or, if it is already in the off-hook condition, when it is placed in the on-hook condition (defined herein as that condition wherein the hook switch of the telephone is in the lower or depressed position).

The "click" signals are defined in Cohen et al. as having distinctive acoustic and electrical properties which can be detected as a function of the frequency of the signal and the voltage level thereof. The Cohen et al. patent provides complex detection circuitry for detecting these click signals and generates an audible and/or visual alarm whenever these signals are detected.

In order to detect these signals, the privacy circuit of Cohen et al. relies on a tuned detection circuit which must be tuned to the specific frequency of the clicks. Since this frequency will vary from telephone to telephone, it requires a manual adjustment of a variable resistor forming part of the tuned circuit. This manual adjustment must be made by the user of the privacy circuit for each individual installation.

BRIEF DESCRIPTION OF THE INVENTION

A primary object of the present invention is to provide a privacy circuit which overcomes the foregoing drawbacks of the prior art and which simply, reliably and inexpensively provides the desired privacy protection to the user of the telephone.

Another object of the present invention is to provide a privacy circuit which can be connected to a single extension telephone and which will provide eavesdropping protection for that telephone whether or not any of the extension telephones are also provided with a privacy circuit.

Another object of the present invention is to provide a privacy circuit which will function normally in response to in-coming ringing signals and will not impair ringing voltages or operation. More particularly, such a telephone will permit the in-coming ringing signal to activate a ringing operation on a multiple number of extension telephones connected in parallel to the same telephone line.

Yet another object of the present invention is to provide a privacy circuit which will not in any way degrade the integrity of the telephone network.

Yet a further object of the present invention is to provide a privacy circuit which will function normally to transmit and receive voice signals and will not impair the voice signal level or quality.

Another object of the present invention is to avoid the need for fine-tuning or adjusting the privacy circuit to the particular needs of a given installation.

The foregoing and other objects of the present invention are achieved, in accordance with the first embodiment of the present invention, by providing a privacy circuit comprising:

a voltage breakdown device which passes current only when the voltage across the device is greater than a predetermined value; and coupling means adapted to couple the voltage breakdown device between a telephone line and a telephone to be protected whereby when the voltage across the voltage breakdown device is less than a predetermined value, current will not pass to the telephone.

In the preferred embodiment, the telephone privacy circuit further includes an audio bypass circuit coupled to the voltage breakdown device for causing audio frequency signals to bypass the voltage breakdown device. A light-emitting diode is also preferably connected in series with the voltage breakdown device so as to provide a visual indication that the voltage breakdown device is not passing current. A disabling switch may also be provided so as to optionally disable the voltage breakdown device and thereby permit multi-party conversations.

In another embodiment of the invention, a delay circuit is provided for disabling the voltage breakdown device for a predetermined time period after the telephone to which the privacy device is connected is first placed in the off-hook condition. This makes it possible for the user of the telephone to place outgoing calls without hindrance from the voltage breakdown device. This delay circuit preferably includes an RC circuit coupled to a capacitance multiplier circuit for effectively increasing the capacitance of the RC circuit.

In yet another embodiment of the invention, a latching circuit is coupled in series with the voltage breakdown device. In this embodiment, the latching circuit is turned on in response to a predetermined minimum voltage which is applied across the latching circuit and remains on as long as the current through the latching circuit is greater than a predetermined minimum value. This embodiment is particularly useful when two extension telephones are each provided with their own privacy device. In such case, the latching circuit ensures that only the first extension telephone gaining access to the telephone line will be permitted to gain access to that line. In this embodiment, the latching circuit will prevent the user from dialing out onto the telephone lines. In order to overcome this problem, a bypass switch is preferably provided which disables the latching circuit when the switch is placed in the bypass position.

The present invention is also directed towards a telephone apparatus, comprising:

a first extension telephone connected in series with a privacy circuit, the combination of the first extension telephone and the privacy circuit being coupled across the tip and ring terminals of a telephone line;

a second extension telephone connected across said tip and ring terminals of said telephone line; and the privacy circuit operating to provide an audio indication to the user of the first extension telephone that the second extension telephone has been placed in the off-hook condition.

The privacy circuit preferably achieves the foregoing result by disabling a second extension telephone whenever the first extension telephone is placed in the off-hook condition. This is achieved by cutting off the flow of current to the second extension telephone.

If desired, the privacy circuit can also provide a visual indication of the fact that the second extension telephone has been placed in the off-hook condition. The privacy circuit is preferably formed utilizing a voltage breakdown device, such as a Zener diode, but may also be formed utilizing an impedance device of sufficiently high impedance that the second extension telephone is effectively shortcircuited by the first extension telephone when the first extension telephone is placed in the off-hook condition.

The present invention is also directed towards a telephone apparatus, comprising:

a first circuit branch including a first extension telephone coupled in series with a first privacy circuit, the first circuit branch being coupled between the tip and ring terminals of a telephone line;

a second circuit branch including a second extension telephone coupled in series with a second privacy circuit, the second circuit branch being coupled across the tip and ring terminals of the telephone line and parallel with the first circuit branch; and each of the privacy circuits including a voltage breakdown element coupled in series with a latching circuit.

The present invention is also directed towards a telephone apparatus, comprising:

an answering machine; and a voltage breakdown circuit connected in series between the answering machine and a telephone line.

The present invention is further directed towards a telephone apparatus, comprising:

automatic recording equipment coupled across the tip and ring terminals of a telephone line, the automatic recording equipment including means for disabling the recording equipment whenever the voltage across the tip and ring terminals is a above a predetermined level; and a telephone connected in series with a privacy device, the series connected telephone and privacy device being coupled across the tip and ring terminals in parallel with the recording equipment, the privacy device causing the voltage across the tip and ring terminals to be greater than the predetermined value whenever the telephone is the only extension telephone connected to the tip and ring terminals which is in the off-hook condition.

IN THE DRAWINGS

For the purpose of illustrating the invention, there are shown in the drawings several embodiments which are presently preferred, it being understood, however, that this invention is not limited to the precise arrangements and instrumentalities shown.

FIG. 1 is a schematic diagram schematic diagram illustrating the manner in which a plurality of extension telephones are connected in parallel to a telephone line connecting a residence or other installation with a central switching station.

FIG. 2 is a circuit diagram showing the manner in which an extension telephone may be connected to a privacy circuit constructed in accordance with the principles of a first embodiment of the present invention.

FIG. 5 is a circuit diagram showing the manner in which an extension telephone may be connected to a privacy circuit constructed in accordance with the principles of a fourth embodiment of the present invention.

DETAILED DESCRIPTION OF THE INVENTION

Figure 3:
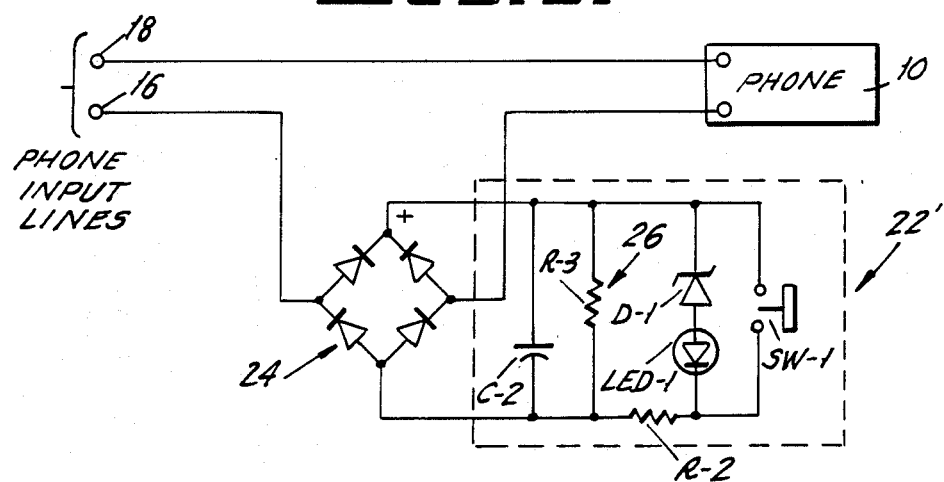
FIG. 3 is a circuit diagram showing the manner in which an extension telephone may be connected to a privacy circuit constructed in accordance with the principles of a second embodiment of the present invention.

Referring now to the drawings wherein like numerals indicate like elements, there is shown in FIG. 1 a schematic diagram illustrating the manner in which three extension telephones 10, 12 and 14 are connected in parallel to the tip and ring terminals 16, 18, of a telephone line connecting a residence (or office, etc.) 20 to a central switching station. The central station appears to the telephone lines as a 48 volt D.C. source with the result that the line voltage $V_L$ available across the tip and ring terminals 16, 18 will be nominally 48 volts when the telephone instruments 10-14 are all in the on-hook condition. When one or more of the telephones 10-14 are placed in the off-hook condition the line voltage $V_L$ will reduce to approximately 10 volts depending upon the distance of the terminals 16, 18 from the central switching station (and, therefore, the values of the distributed resistance $R_L$ of the telephone line), the internal impedances of the telephones 10-14 and the number of telephones which are in the off-hook position.

In order to operate properly, the voltage available to the input of each telephone 10, 12 and 14 must be at least a minimum value, typically 10 volts, determined by the internal impedance of the telephone. As long as sufficient line voltage $V_L$ is available at the tip and ring terminals 16, 18, the extension telephones 10-14 will be operable. If the voltage available to the telephone is below the minimum value required for operation of that telephone, the telephone will be disabled. The present invention relies on this fact to disable a first extension telephone (e.g., telephone 10) which is already in use by a first party whenever a second party, located at the residence 20, places a second extension telephone (e.g., telephone 12) in the off-hook condition for the purpose of eavesdropping on the first party's telephone conversation. Since the telephone of the first party has been disabled, he will no longer have an audio connection with the party he was speaking to and will, therefore, know that someone else has picked up an extension telephone at his residence 20. While the invention will be described herein with reference to the situation where the eavesdropping party is using an extension telephone located at the residence 20, it should be apparent to those skilled in the art that the invention will also enable the detection of any eavesdropper who taps into the telephone line as long as he is effectively coupled across the tip and ring terminals 16, 18.

Referring now to FIG. 2, a first embodiment of a privacy circuit 22 constructed in accordance with the principles of the present invention is coupled between extension telephone 10 and the tip and ring terminals 16, 18 via a diode bridge 24. Diode bridge 24 serves as a polarizing circuit which enables the series connected telephone 10 and privacy circuit 22 to be connected to the telephone line without concern for the polarization of the line. It will be assumed for the purpose of describing the operation of the privacy circuit 22 of the present embodiment that the remaining extension telephones 12, 14 are not provided with their own privacy circuits.

The heart of privacy circuit 22 is a Zener diode D-1 whose Zener breakdown voltage $V_D$ is chosen to be sufficiently low that extension telephone 10 will be provided with sufficient voltage to enable the telephone 10 to operate when the telephone 10 is the only extension telephone in use (in the off-hook condition) and which is sufficiently high that there will be insufficient voltage available to operate extension telephone 10 when either the second or third extension telephones 12, 14 are in use (in the off-hook condition) and these telephones do not, themselves, contain a privacy circuit 22. Thus, Zener diode D-1 provides protection against eavesdropping while the telephone is in its conversation mode, i.e. while a telephone call is being conducted. An RC circuit including resistor R-1 and capacitor C-1 is preferably placed in parallel with diode D-1 to act as an audio bypass for both voice and ringing signals. In the present preferred embodiment, a light-emitting diode LED-1 (a lamp or other light-emitting device could also be used) is placed in series with the Zener diode D-1 to provide a visual indication that the remaining extension telephones 12, 14 are not in use. Particularly, light-emitting diode LED-1 will be on whenever extension telephone 10 is the only telephone in use and will turn off whenever one of the remaining extension telephones is placed in the off-hook position. A resistor R-2 is placed in series with LED-1 in order to limit the current to the diode and to ensure that it does not burn out in response to undersired voltage surges.

The manner in which privacy circuit 22 operates to inform the user of extension telephone 10 that an eavesdropper has picked up one of the remaining extension telephones 12, 14 will now be described with reference to FIGS. 1 and 2. When a party placing an outgoing call picks up the handset of extension telephone 10 (so as to place the telephone in the off-hook condition), the entire 48 volts generated by the central switching station will be available to the diode D-1 (this assumes that telephones 12, 14 are both in the on-hook condition) driving the diode into reverse saturation. As a result, the Zener breakdown voltage $V_D$ will appear across diode D-1. The remaining portion of the 48 volts will be divided between the line impedances $R_L$, the resistor R-2 and the extension telephone 10. The breakdown voltage $V_D$ of Zener diode D-1 is chosen to be sufficiently low that the requisite voltage (typically 10 volts) is available to properly operate extension telephone 10. In this condition, both the light-emitting diode LED-1 and the extension telephone 10 will be enabled. This provides the user of telephone 10 with both a visual and an audio indication that he is the only user of an extension telephone in residence 20.

If a would-be eavesdropper subsequently picks up the extension telephone 12 (or alternatively telephone 14), this will place the extension telephone in parallel with extension telephone 10. Presuming that the impedance of the two extension telephones 10, 12 are approximately equal, the equivalent impedance of the two telephones in parallel will be approximately one-half of the impedance of extension telephone 10 alone. This will reduce the line voltage $V_L$ across the tip and ring terminals 16 and 18. While this voltage will be sufficient to enable the operation of extension telephone 12, it will be insufficient to enable the operation of extension telephone 10. Particularly, since $V_D$ volts are used by Zener diode D-1, extension telephone 10 will only have available to it $V_L - V_D$ volts. The breakdown voltage $V_D$ is preferably sufficiently high (e.g., 15 volts) to ensure that sufficient voltage will not be available at the tip and ring terminals 16, 18 to drive diode D-1 into reverse saturation when telephone 12 (or 14) is placed in the off-hook condition. As such, when an eavesdropper picks up either extension telephone 12 or extension telephone 14, Zener diode D-1 will operate as an open circuit and no current will be available to extension telephone 10. This will cause telephone 10 to go dead and light-emitting diode LED-1 to be extinguished providing both an audio and a visual indication that a third party has picked up one of extension telephones 12, 14.

In the presently preferred embodiment, privacy circuit 22 includes a bypass switch SW-1 (while a mechanical switch is shown, it should be apparent to those skilled in the art that an electronic switch could also be used) which can be used to effectively disable privacy circuit 22 by shortcircuiting the Zener diode D-1.

Switch SW-1 serves two primary purposes. If the user of extension telephone 10 wishes to conduct a conference call wherein a second party at his residence uses one of the extension telephones 12, 14, he can place switch SW-1 in the closed position so as to permit both his extension telephone 10 and the remaining extension telephone to be operative at the same time. The switch SW-1 is also useful when the user of telephone 10 is conducting a private call. If an eavesdropper at residence 20 picks up one of the extension telephones 12, 14, telephone 10 will go dead as described above. While this provides the user of telephone 10 with an indication that someone has picked up an extension telephone at his residence, he does not have access to the telephone line and cannot ask the eavesdropper to hang up. By closing the switch SW-1, he regains access to the telephone line and can talk both to the eavesdropper and to the party he was originally calling (or who originally called him). While the switch SW-1 is shown as a normally open switch, it will be understood by those skilled in the art that a normally closed switch can be used if desired. In such a case, the user will enable the privacy circuit 22 (and thereby provide privacy protection for the user) by placing the switch SW-1 in the open position.

While the embodiment of the invention illustrated in FIG. 2 is generally useful, it is somewhat unreliable and can be defeated in the event that the second extension telephone used by the eavesdropper is also equipped with a privacy circuit 22, or in the event that the telephone 10 has a relatively low internal impedance while the eavesdropper's extension telephone has a relatively high internal impedance. In the former case, the telephone 10 and its privacy circuit 22 will be in parallel with a second telephone (e.g., 12) and its privacy circuit with the result that both Zener diodes will be driven into reverse saturation. The current available from the 48 volt source defined by the central exchange will then be divided up between the two line resistances RL and the two telephones 10, 12. This current will normally be sufficient to drive both telephones and the user of the telephone 10 will not be aware that an eavesdropper has picked up the extension telephone.

In the event that the telephone has relatively low internal impedance and the eavesdropper's extension telephone (e.g., 12) has a relatively high impedance, the voltage $V_L$ across the tip and ring terminals 16, 18 will be determined by the internal resistance of the high impedance extension telephone. If this impedance is sufficiently high, the voltage at the tip and ring terminals 16, 18 will be greater than the breakdown voltage of the Zener diode D-1 and operating current will be available to the telephone 10. Under most cases, this operating current will be sufficiently low that the audio output of extension telephone 10 will be sufficiently degraded that the user of telephone 10 will be aware that an eavesdropper has picked up the extension telephone and is, therefore, provided with an audio indication of this fact. If the resistance of the extension telephone is, however, sufficiently high, the current to extension telephone 10 will remain sufficiently high that the user of that extension telephone does not notice a degradation in the audio output of that telephone. In such a case, the privacy circuit of FIG. 2 will not provide adequate protection to the user of extension telephone 10.

The embodiment of FIG. 3 overcomes the foregoing drawbacks by including a delay circuit 26 which effectively disables the operation of privacy circuit 22' for a predetermined time period after the extension telephone 10 is first placed in the off-hook condition. The delay circuit 26 includes a resistor R-3 and a capacitor C-2 which form an RC circuit having a time constant which is sufficiently long to ensure that the voltage across capacitor C-2 will not reach the Zener breakdown voltage $V_D$ of diode D-1 until after a predetermined time period, for example, four seconds. Before that time, the capacitor C-2 effectively shunts the diode D-1 and effectively disables the privacy circuit during that initial time period. During this initial time period, telephone phone 10 will be provided with no protection against an eavesdropper. The user of extension telephone 10 will be aware of this fact, however, since the light-emitting diode LED-1 will not be on. After the predetermined time period has expired, the charge across capacitor C-2 will remain at the Zener breakdown voltage $V_D$ and current will flow through the diode D-1 and the light-emitting diode LED-1.

In order to describe the operation of privacy circuit 22', it will be presumed that both extension telephones 10, 12 are equipped with a respective privacy circuit 22' and that telephone 10 has been in the off-hook condition for a sufficient period of time for capacitor C-2 to have charged to the Zener breakdown voltage $V_D$. Thereafter, extension telephone 12 is placed in the off-hook condition. During the initial delay period established by delay circuit 26, Zener diode D-1 will be shortcircuited by capacitor C-2 and the privacy circuit 22' connected to telephone 12 will be disabled. As a result, the extension telephone 10 will be the only telephone connected in series with a Zener diode D-1 during the initial delay period (e.g., four seconds) and extension telephone 10 will be disabled. This will provide the user of extension telephone 10 with both an audio and a visual indication that a would-be eavesdropper has picked up one of the extension telephones 12, 14 for the four second delay period defined by delay circuit 26. In this manner, the delay circuit 26 overcomes the drawbacks of the embodiment of FIG. 2 at least with respect to the problems which occur when more than one extension telephone is provided with a privacy circuit. As in the embodiment of FIG. 2, the privacy circuit 22' includes a switch SW-1 which can disable the privacy circuit 22' whenever the individual utilizing extension telephone 10 wishes to conduct a multi-party call.

While the construction of privacy circuit 22' is simple and generally inexpensive, it requires the use of a relatively large capacitor C-2 (typically in the area of 4700 microfarads) to attain the desired time delay. In order to avoid the need for such a large capacitor, the privacy circuit 22" illustrated in FIG. 4 utilizes a Darlington circuit including transistors Q-1 and Q-2 which are connected to the capacitor C-2 to operate as a capacitance multiplier circuit. Using such a connection, the capacitance of capacitor C-2 can be reduced to the range of approximately 4.7 microfarads. As in the prior embodiment, the capacitor C-2 cooperates with the resistor R-3 to define the delay circuit 26. In a typical application, the resistance of resistor R-3 is relatively high (approximately 470 k ohms) and serves to impede the charging current to the capacitor C-2 whose capacitance is relatively low (approximately 4.7 microfarads). The current through capacitor C-2 is at a miniscule level (typically in the microamp region). This current is below the minimum line current of approximately 50 milliamps which the central exchange requires to sustain a connection between the central exchange and the residence 20 (below this current level, the exchange will disconnect residence 20). To avoid this problem, the Darlington circuit amplifies the current through capacitor C-2 so as to ensure sufficient line current.

A second RC circuit comprising resistor R-4 and capacitor C-3 is provided across the emitter and collector of transistor Q-2 and serves as bypass for the audio and ringing signals. A transistor Q-3 and resistor R-6 are also provided to limit excessive current flow through light-emitting diode LED-1. As in the prior embodiments, a switch SW-1 is provided to disable the privacy circuit 22" when desired. A current limiting resistor R-7 is placed in series with switch SW-1 so as to limit excessive instantaneous conduction through telephone 10.

Figure 4:
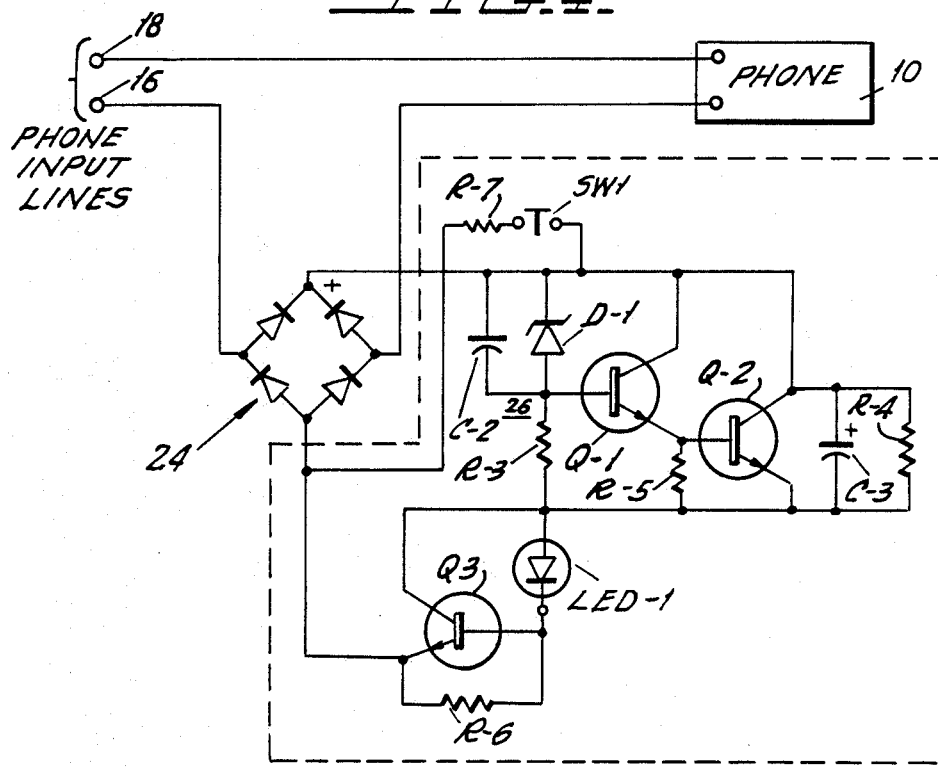
FIG. 4 is a circuit diagram showing the manner in which an extension telephone may be connected to a privacy circuit constructed in accordance with the principles of a third embodiment of the present invention.

While the embodiments of FIGS. 3 and 4 are operable even where all of the extension telephones are connected to a privacy circuit 22' or 22", they will not always operate properly if the impedance of the extension telephones 10, 12, 14 are significantly different. To overcome this problem, the embodiment of FIG. 5 utilizes a latching circuit 28 in series with the Zener diode D-1. The latching circuit 28 operates to ensure that only the first extension telephone having a privacy circuit connected thereto will gain access to the telephone line. In the embodiment described herein, the latching circuit 28 is placed in series with the circuitry of FIG. 2. It should be recognized, however that the latching circuit 28 can be used with any of the other embodiments of the present invention.

In the presently preferred embodiment, the latching circuit 28 includes a silicon controlled rectifier SCR-1 (or equivalent device such as a triac or a transistor regenerative circuit) whose gate is connected to the node between resistor R-7 and Zener diode D-2. The breakdown voltage of the Zener diode D-2 is selected such that the total breakdown voltage of Zener diodes D-1 and D-2 is lower than the 48 volts available at the tip and ring terminals 16, 18 when the telephones 10–14 are in the on-hook condition but substantially higher than the voltage available at the tip and ring terminals 16, 18 once a first one of the telephones 10, 12 or 14 has been placed in the off-hook condition and the operation of its privacy circuit has stabilized. A breakdown voltage for the diode D-2 of approximately 36 volts has been found to be suitable for most applications.

If extension telephone 10 is the first telephone in residence 20 to be placed in the off-hook position, the full 48 volts available across the tip and ring terminals 16, 18 will be available to drive diodes D-1 and D-2 into reverse saturation. This will cause a trigger pulse to be applied to the gate of SCR-1 which turns SCR-1 on. SCR-1 will remain on as long as sufficient driving current is available through resistor R-2. If a second extension telephone 12 or 14 connected to its own privacy circuit 22" is then placed in the off-hook condition, the voltage available across terminals 16, 18 will be too low to drive both Zener diodes D-1 and D-2 of that privacy circuit into reverse saturation. As such the SCR-1 of that privacy circuit will not be turned on and the second extension telephone will not gain access to the line.

As noted above, SCR-1 will remain activated only as long as sufficient driving current is available through resistor R-2. If telephone 10 is a rotary-type telephone, the voltage across the tip and ring terminals 16, 18 will momentarily drop to zero as a number is dialed utilizing the rotary call-out means. This momentary drop in voltage will prevent sufficient current from being applied to SCR-1 and SCR-1 will open circuit with the result that the telephone 10 will be disconnected from the telephone line. A similar problem occurs with a touchtone-type telephone. When a full telephone number has been dialed utilizing a touch tone telephone, the central station will momentarily drop the voltage across the tip and ring terminals 16, 18 as it is making a connection to the remote telephone being called (i.e., the party being called by the individual at residence 20). This momentary drop in voltage causes SCR-1 to open thereby disconnecting telephone 10 from the telephone line.

In order to overcome this problem, privacy circuit 22"" includes a bi-stable switch SW-1' which can be placed in the closed position until the person using telephone 10 has made a connection with the party he is calling. At that point, the voltage across the tip and ring terminals 16, 18 should no longer drop to zero and the privacy circuit 22"" can be enabled by placing a switch SW-1' in the open position. While the use of the switch SW-1' enables the party using telephone 10 to dial out, it can sometimes be used to negate the effect of the privacy circuit 22"". This will happen if both the telephone which is first placed on the off-hook condition (e.g., telephone 10) and an extension telephone (e.g., extension telephone 12) are both provided with a privacy circuit 22"" and the extension telephone 10 is a low impedance telephone while the extension telephone 12 is a high impedance telephone. In this case, a would-be eavesdropper could gain access to the telephone line by closing the switch SW-1' of his privacy circuit 22"" and placing the extension telephone 12 in the off-hook position. Under these conditions, there will be a temporary surge in current into the extension telephone 12 with the result that current momentarily ceases through the SCR-1 of the telephone privacy circuit associated with extension telephone 10. It has been found experimentally that if the Zener diode D-2 has a breakdown voltage of less than about 25 volts, the SCR-1 will substantially immediately retrigger and the user of extension telephone 10 will not be aware that an eavesdropper has picked up extension telephone 12. It has been found experimentally, however, that this problem can be overcome by selecting the breakdown voltage of Zener diode D-2 to be greater than approximately 30 volts or approximately 60% of the voltage available at the central station. When using such a voltage, it has been found that current through the SCR-1 does not regenerate with the result that the extension telephone 10 will be disabled.

A major advantage of this embodiment of the present invention is that it will provide the desired privacy protection both in connection with other extension telephones which have a similar privacy circuit and in connection with extension telephones which have no privacy circuit and in both instances, the relative impedances of the extension telephones do not adversely effect the operation of the privacy circuit.

The manner in which the privacy circuit of the present invention informs the user of the extension telephone that a third party has attempted to eavesdrop on his conversation has been described above. The privacy circuit of the present invention is also useful, however, in inhibiting the operation of an automatic tape recorder connected in parallel with the extension telephone and also in inhibiting the operation of a telephone answering machine which is connected in series with the privacy circuit of the present invention.

Automatic tape recording equipment is commercially available which is connected in parallel with a plurality of extension telephones and records all conversations on those telephones. This equipment senses the line voltage $V_L$ to determine if any of the extension telephones 10–14 is placed in the off-hook condition. Under normal conditions, the voltage $V_L$ will drop from approximately 48 volts to approximately 10 volts when one of the extension telephones 10–14 is placed in the off-hook condition. When the automatic taperecording equipment determines that the line voltage $V_L$ has fallen below a predetermined value (e.g., 12 volts), it presumes that one of the telephones has been placed in the off-hook position and begins recording the conversation on the telephone line.

The privacy circuit of the present invention can be utilized to ensure that telephone conversations on a given extension telephone are not recorded by the recording apparatus. For example, if user of extension telephone 10 wishes to ensure that his conversations are no recorded, he need only place the privacy circuit of the present invention in series with the extension telephone 10. In such a case, when the extension telephone 10 is placed in the off-hook condition, the Zener diode D-1 associated with that telephone will maintain the line voltage $V_L$ above the threshold level (12 volts in the example given above) which the recording device is looking for. As such, the recording device will not detect that the extension telephone has been placed in the off-hook condition and the conversation of the party using the extension telephone 10 will not be recorded. The recording apparatus will, however, be able to record conversations on the remaining telephones 12, 14 if these telephones are not connected to their own privacy circuits. This might be particularly important in an office situation, wherein an executive wishes to have a telephone conversation to third parties in his office recorded but does not wish to have his own telephone conversation recorded.

Telephone answering machines are also well known in the art and will automatically answer an incoming call after a predetermined number of rings (typically four rings) if a separate extension is not first answered (placed in the off-hook condition). Once the answering machine connects itself to the telephone line, it will play back a prerecorded message typically requesting the caller to leave a message after a tone generated by the answering machine is heard. If an individual at the residence 20 picks up an extension telephone after the answering machine has begun its prerecorded message, it is difficult, if not impossible, for that party to speak to the individual making the incoming call since he can not normally be heard over the prerecorded message. Accordingly, the calling party may hang up before the party at the residence 20 can speak to him.

The foregoing problem can be overcome by placing one of the privacy circuits of the present invention in series with a telephone answering machine. In such a case, the prerecorded message will be sufficiently muted, if not totally cut off (this depends primarily on the resistances of the extension telephones and which embodiment of the privacy circuit is used) once any one of the extension telephones 10, 12, 14 is placed in the off-hook position. Accordingly, the party picking up that extension telephone can successfully communicate with the person calling the residence 20 without interference from the answering machine's prerecorded outgoing message.

In the embodiment illustrated in FIG. 2, a Zener diode D-1 is used as the primary element of the privacy circuit 22. Under some conditions, the Zener diode D-1 can be replaced by a resistor of sufficiently high magnitude to ensure that the current passing through extension telephone 10 when the extension telephone 12 or 14 is placed in the off-hook position (this presumes that the latter telephones do not include their own privacy circuits) is not sufficient to satisfactorily operate the extension telephone 10. In this embodiment, the resistor replacing diode D-1 is of sufficiently high impedance that the extension telephone 12 or 14 effectively shortcircuits the series connected extension telephone 10 and privacy circuit 22.

The present invention may be embodied in other specific forms without departing from the spirit or essential attributes thereof and, accordingly, reference should be made to the appended claims, rather than to the foregoing specification as indicating the scope of the invention.

What is claimed is:

1. A telephone privacy circuit for use with a telephone of the type which includes first and second terminals adapted to be coupled across the tip and ring lines of a telephone line, respectively, said privacy circuit comprising:
   a voltage breakdown device which passes current only when the voltage across the device is greater than a predetermined value; and
   coupling means adapted to couple said voltage breakdown device in series between one of said tip and ring lines and said first terminal of said telephone in such a manner that when said voltage breakdown device is coupled in series with said first terminal of said telephone and said second terminal of said telephone is coupled to the other of said tip and ring lines of said telephone line current will not pass to said telephone whenever the voltage across said voltage breakdown device is less than said predetermined value whereby protection against eavesdropping is provided.

2. The telephone privacy circuit of claim 1, further including an audio bypass circuit coupled to said voltage breakdown device for causing audio frequency signals to bypass said voltage breakdown device.

3. The telephone privacy circuit of claim 1, further including a disable switch operable in a first position wherein it disables said voltage breakdown device and a second position wherein it enables said voltage breakdown device.

4. The telephone privacy circuit of claim 3, wherein said voltage breakdown device comprises a Zener diode.

5. The telephone privacy circuit of claim 1, further comprising a latching circuit coupled in series with said voltage breakdown device.

6. The telephone privacy circuit of claim 5, wherein said latching circuit is turned on in response to a predetermined minimum voltage which is applied to said latching circuit and remains on as long as a current which is greater than a predetermined minimum value flows through said latching circuit.

7. The telephone privacy circuit of claim 6, wherein said latching circuit comprises:
   an SCR whose anode is coupled to said voltage breakdown device and whose cathode is connected to said telephone;

a second voltage breakdown device coupled between said anode and the gate of said SCR.

8. The telephone privacy circuit of claim 7, wherein said second voltage breakdown device has a breakdown voltage of approximately at least 30 volts.

9. The telephone privacy circuit of claim 6, further including a bypass switch for selectively bypassing said latching circuit.

10. The telephone privacy circuit of claim 9, wherein said bypass switch is human operable.

11. The telephone privacy circuit of claim 9, wherein said bypass switch also selectively bypasses said voltage breakdown device.

12. The telephone privacy circuit of claim 1, wherein said telephone line comprises at least a first conductor and a second conductor and further wherein said telephone comprises at least a first terminal and a second terminal, said coupling means comprising a diode bridge circuit having first and second input terminals and first and second output terminals, said first telephone terminal being connected to said first conductor of said telephone line and said second terminal of said telephone being connected to said second input terminal of said bridge and said second conductor of said telephone line being connected to said first input terminal of said bridge.

13. The telephone privacy circuit of claim 12, wherein said series circuit includes a light-emitting device connected in series with said voltage breakdown device to provide a visual indication that said voltage breakdown device is not passing current.

14. The telephone privacy circuit of claim 13, wherein said series circuit is connected to at least one of said output terminals of said bridge.

15. The telephone privacy circuit of claim 13, further including a disable switch operable in a first position wherein it disables said voltage breakdown device and said light-emitting device so as to disable said telephone privacy circuit and a second position wherein it enables said voltage breakdown device and said light-emitting device so as to enable said privacy device.

16. A telephone apparatus, comprising:
a first extension telephone connected in series with a privacy circuit, the combination of said first extension telephone and said privacy circuit being coupled across the tip and ring terminals of a telephone line;
a second extension telephone connected across said tip and ring terminals in parallel with the combination of said first telephone and said privacy circuit, said privacy circuit including an impedance device of sufficiently high impedance that said first extension telephone is disabled by said second extension telephone when said second extension telephone is placed in the off-hook condition; and
said privacy circuit operating to provide an audio indication to the user of said first extension telephone that said second extension telephone has been placed in the off-hook condition.

17. The telephone apparatus of claim 16, wherein said privacy circuit disables said first extension telephone whenever said second extension telephone is placed in the off-hook condition.

18. The telephone apparatus of claim 17, wherein said privacy circuit disables said first extension telephone by cutting off the flow of current through said first extension telephone.

19. The telephone apparatus of claim 17, wherein said privacy circuit re-enables said first extension telephone once said second extension telephone has been returned to the on-hook condition.

20. The telephone apparatus of claim 16, wherein said privacy circuit also provides a visual indication of the fact that said second extension telephone has been placed in the off-hook condition.

21. The telephone apparatus of claim 16, wherein said privacy circuit also provides an audio indication that said second extension telephone has been returned from the off-hook to the on-hook condition.

22. The telephone apparatus of claim 16, wherein said predetermined value is less than the voltage available across said tip and ring terminals when said first extension telephone is in the on-hook condition and is more than the voltage available at the tip and ring terminals when both said first and second extension telephones are in the off-hook condition.

23. The telephone apparatus of claim 16, wherein said impedance device comprises a voltage breakdown device which conducts current only when the voltage across said voltage breakdown device is greater than a predetermined value.

24. A telephone apparatus, comprising:
a first circuit branch including a first extension telephone coupled in series with a first privacy circuit, said first circuit branch being coupled between the tip and ring terminals of a telephone line;
a second circuit branch including a second extension telephone coupled in series with a second privacy circuit, said second circuit branch being coupled across said tip and ring terminals of a telephone line in parallel with said first circuit branch;
each said privacy circuit including a voltage breakdown element coupled in series with a latching circuit; and
said voltage breakdown element being effective for passing current only when the voltage across said element is greater than a predetermined value, and wherein said latching circuit is activated by current passing through its said respective voltage breakdown element.

25. The telephone apparatus of claim 24, wherein each said latching circuit includes a gating element and responds to a predetermined minimum voltage which is applied to its said gating element and remains on as long as a current which is greater than a predetermined minimum value flows through said latching circuit.

26. The telephone apparatus of claim 25, wherein each said privacy circuit includes a respective human operable switch for disabling said privacy circuit.

27. The telephone apparatus of claim 26, wherein the parameters of each said privacy circuit are such that the latching circuit of each respective privacy circuit will be disabled as long as the extension telephone coupled to the remaining privacy circuit is in the off-hook condition and said remaining privacy circuit is disabled by said human operable switch.

28. The telephone privacy circuit of claim 1, further comprising a delay circuit for disabling said voltage breakdown device for a predetermined time period after the telephone to which said privacy circuit is connected by said coupling means is first placed in the off-hook condition.

29. The telephone privacy circuit of claim 28, wherein said delay circuit includes an RC circuit and a capacitance multiplier circuit for effectively increasing the capacitance of said RC circuit.

30. The telephone privacy circuit of claim 29, wherein said capacitance multiplier circuit includes a Darlington transistor pair.

* * * * *